Patented June 13, 1933

1,913,404

UNITED STATES PATENT OFFICE

VIRGIL E. MEHARG, OF BLOOMFIELD, NEW JERSEY, AND HOMER ADKINS, OF MADISON, WISCONSIN, ASSIGNORS TO BAKELITE CORPORATION, OF NEW YORK, N. Y., A CORPORATION OF DELAWARE

PROCESS OF PREPARING FORMALDEHYDE BY THE OXIDATION OF METHYL ALCOHOL WITH THE AID OF A CATALYST

No Drawing. Application filed May 7, 1927. Serial No. 189,737.

This invention relates to the preparation of formaldehyde by oxidation of methyl alcohol in the presence of improved catalysts.

It is well known that methyl alcohol can be oxidized to formaldehyde by means of oxygen or an oxygen containing gas, such as air, and that it is advantageous to use certain catalysts. Metallic copper, metallic silver, and vanadium oxids have been commonly so used.

According to the present invention, formaldehyde is prepared by passing a gaseous mixture of methyl alcohol and oxygen or air into contact, under carefully controlled conditions, with a catalyst comprising an oxid of molybdenum in suitable admixture or association with another oxid or oxids capable of promoting the activity of molybdenum oxid in this particular reaction without otherwise impairing its valuable characteristics.

Our investigations have shown that molybdenum oxid possesses excellent and in some respects unique characteristics for the formaldehyde reaction, especially in that its use, under otherwise proper conditions, is accompanied by very low combustion losses and by comparatively little tendency to the formation of acid or other objectionable by-products of reaction. On the other hand, molybdenum oxid alone is decidedly deficient in activity. Our invention contemplates the employment, in the formaldehyde reaction, of certain mixed catalysts whereof molybdenum oxid is an essential component, its activity being promoted and enhanced by certain oxid additions, among which we prefer the oxids of vanadium, iron, lanthanum, thorium, neodymium, zinc and tin or mixtures thereof. The mixed catalyst should however retain the desirable peculiarities and characteristics of molybdenum oxid; and to this end the molybdenum oxid should constitute the controlling or functionally predominating portion of the catalyst. Thus when it is associated with a highly active oxid such as vanadium oxid, the molybdenum oxid ($MoO_3$) should be present in at least equimolecular proportions with the vanadium oxid ($V_2O_5$) and preferably in considerably higher proportion than this, constituting preferably about 50% by weight of the mixed oxids, or even more. Naturally, with less active promoting oxids more latitude is permissible in choosing suitable proportions; but it will be found satisfactory practice in general to employ the mixed oxids in approximately equal weight proportions.

Our invention is not restricted to the choice of any particular oxids of the metals mentioned; and it is possible that in use the oxids originally present or some of them may become reduced wholly or in part to lower oxids, so that the precise composition of the active or operating catalyst may be uncertain. Satisfactory results have however been obtained with mixtures prepared initially to contain equal weights of the molybdenum oxid ($MoO_3$) and the promoting oxid, such as $V_2O_5$, FeO, and the like.

Instead of using a binary mixture such as the above, we prefer in some cases to employ ternary mixtures, or even more complex mixtures. For example we have obtained excellent results with a mixed catalyst containing approximately 45% each of the oxids of molybdenum and vanadium, associated with about 10% of ferrous oxid. Another excellent mixture contains about 50% $MoO_3$, 40% $V_2O_5$ and 10% FeO. These formulæ may also be modified to increase somewhat the proportion of molybdenum or vanadium oxids, or either of them, while correspondingly reducing the proportion of iron oxid, percentages of iron oxid as low as 1 or 2 percent exhibiting a marked effect in increasing the activity of the catalyst, and an appreciable effect in increasing the efficiency of conversion. We prefer however, that the mixture of catalysts should contain at least 40% by weight of the molybdenum oxid component.

The temperature of the catalyst may vary within wide limits, dependent upon various circumstances, such as time of contact of the gases with the catalyst, the particular composition of the catalyst, etc. Ordinarily, the temperature may vary from about 225° to about 500° C. When mixtures comprising an oxid of molybdenum and an oxid of iron or an oxid of vanadium are used, the optimum temperature lies at about from 340° to 370° C.

The ratio of methyl alcohol to air used in this process may also vary considerably, although usually the air is used in greater than the theoretical quantity required to oxidize the alcohol to formaldehyde. Mixtures of air to from five to fifteen parts by weight of air to one part by weight of methyl alcohol in the form of vapor have been used with good results. Preferably, however, approximately eight parts by weight of air to one part by weight of methyl alcohol are used.

The time of contact of the gases with the catalyst is dependent upon the temperature, the composition and character of the catalyst, and other factors, and may therefore vary within very wide limits. However, a short period of contact is desirable and we have found that contact for a period ranging from one-tenth to one-half of a second is satisfactory. A time of contact as low as one-hundredth of a second has been found to be effective under some conditions. Preferably, the catalyst is deposited or coated upon a carrier or support; and the latter is preferably made of a metal which is a good thermal conductor. The practice heretofore has been to employ, as carriers for the catalyst, bodies affording a large contacting surface per unit of volume, such for example as granules, ribbons, rods, ribbed structures and the like. In contrast to this we have found that much better results are secured by using as carriers bodies having a large or even maximum volume per unit of surface, as for example spheres or spheroidal bodies, which may be somewhat elongated, or cubes or other geometric forms having rounded corners, or equivalent shapes, hereinafter referred to simply as spheroidal bodies or metal spheroids. By using as carriers such spheroidal shapes, the carriers being preferably of approximately uniform size and made of a metal of high thermal conductivity, two distinct advantages are secured: the relatively large mass of metal functions as a heat-accumulator to aid in controlling the temperature; and the rounded forms insure an even and regular gas flow. Spheroidal bodies and 3/16 inch in diameter have proven satisfactory, but they may of course be either larger or smaller than this. These special advantages arising from the use of spheroidal shapes are not limited to the particular catalysts hereinabove mentioned, nor to the particular process of this application. They may advantageously be used with other catalysts, and in catalytic reactions generally.

The use of the oxid-mixtures of this invention makes it possible to obtain a much higher efficiency of reaction than can be obtained by the employment of catalysts heretofore used. A more complete conversion of the methyl alcohol and a higher yield of formaldehyde are obtained. As contrasted with the vanadium oxids alone, our mixtures of metal oxids cause less combustion losses and produce less by-products and especially less acid. The presence of acid in formaldehyde is undesirable, as is well known. As contrasted with the use of metallic copper or silver as a catalyst, the process of this invention is also much more efficient. Our catalysts are less costly than silver. They enable substantially complete conversion of alcohol and thus the necessity for distillation of the product to remove non-reacted alcohol is removed where an alcohol free product is desired. Furthermore, our catalysts are much more rugged than is silver. They are not subject to many poisons—not nearly as many as is silver.

This application is a continuation-in-part of our application Ser. No. 165,753, filed Feb. 3, 1927.

We claim:

1. Process of producing formaldehyde by passing a gaseous mixture including methyl alcohol and oxygen into contact with a heated catalyst characterized in that a mixture of an oxide of molybdenum and a promoting oxide of at least one of the amphoteric metals of the group consisting of iron, lanthanum, thorium, neodymium, zinc and tin, the oxide of molybdenum constituting at least 40 per cent by weight of the oxide mixture is used as the catalyst.

2. Process of producing formaldehyde by passing a gaseous mixture including methyl alcohol and oxygen into contact with a heated catalyst characterized in that a mixture of an oxide of molybdenum, an oxide of vanadium, and a promoting oxide of at least one of the amphoteric metals of the group consisting of iron, lanthanum, thorium, neodymium, zinc and tin, the oxide of molybdenum constituting at least 40 per cent by weight of the oxide mixture is used as the catalyst.

3. Process of producing formaldehyde by passing a gaseous mixture including methyl alcohol and oxygen into contact with a heated catalyst characterized in that a mixture of an oxide of molybdenum and an oxide of iron, the oxide of molybdenum constituting at least 40 per cent by weight of the oxide mixture is used as the catalyst.

4. Process of producing formaldehyde by passing a gaseous mixture including methyl alcohol and oxygen into contact with a heated catalyst characterized in that a mixture of an oxide of molybdenum, an oxide of vanadium, and an oxide of iron, the oxide of molybdenum constituting at least 40 per cent by weight of the oxide mixture is used as the catalyst.

5. Process of producing formaldehyde by passing a gaseous mixture including methyl alcohol and oxygen into contact with a heated catalyst characterized in that a mixture of approximately 45 per cent each of the oxides of molybdenum and vanadium, and approximately 10% of ferrous oxide is used as the catalyst.

6. Process of producing formaldehyde by passing a gaseous mixture including methyl alcohol and oxygen into contact with a heated catalyst characterized in that a mixture consisting essentially of an oxide of molybdenum and an oxide of iron, the oxide of iron constituting at least 1% and the oxide of molybdenum constituting at least 40% of the weight of the oxide mixture, is used as the catalyst.

7. Process of producing formaldehyde by passing a gaseous mixture including methyl alcohol and oxygen into contact with a heated catalyst characterized in that a mixture consisting essentially of an oxide of molybdenum and an oxide of iron, the oxide of iron constituting from 1% to 50% of the weight of the oxide mixture, is used as the catalyst.

8. Process of producing formaldehyde by passing a gaseous mixture including methyl alcohol and oxygen into contact with a heated catalyst characterized in that a mixture consisting essentially of an oxide of molybdenum, an oxide of vanadium, and an oxide of iron, the oxide of iron constituting at least 1% and the oxide of molybdenum constituting at least 40% of the weight of the oxide mixture, is used as the catalyst.

In testimony whereof, we affix our signatures.

VIRGIL E. MEHARG.
HOMER ADKINS.